Sept. 23, 1952 H. PREBLE, JR 2,611,406
SLICING MACHINE IN COMBINATION WITH A CABINET THEREFOR
Filed Feb. 23, 1950 2 SHEETS—SHEET 1
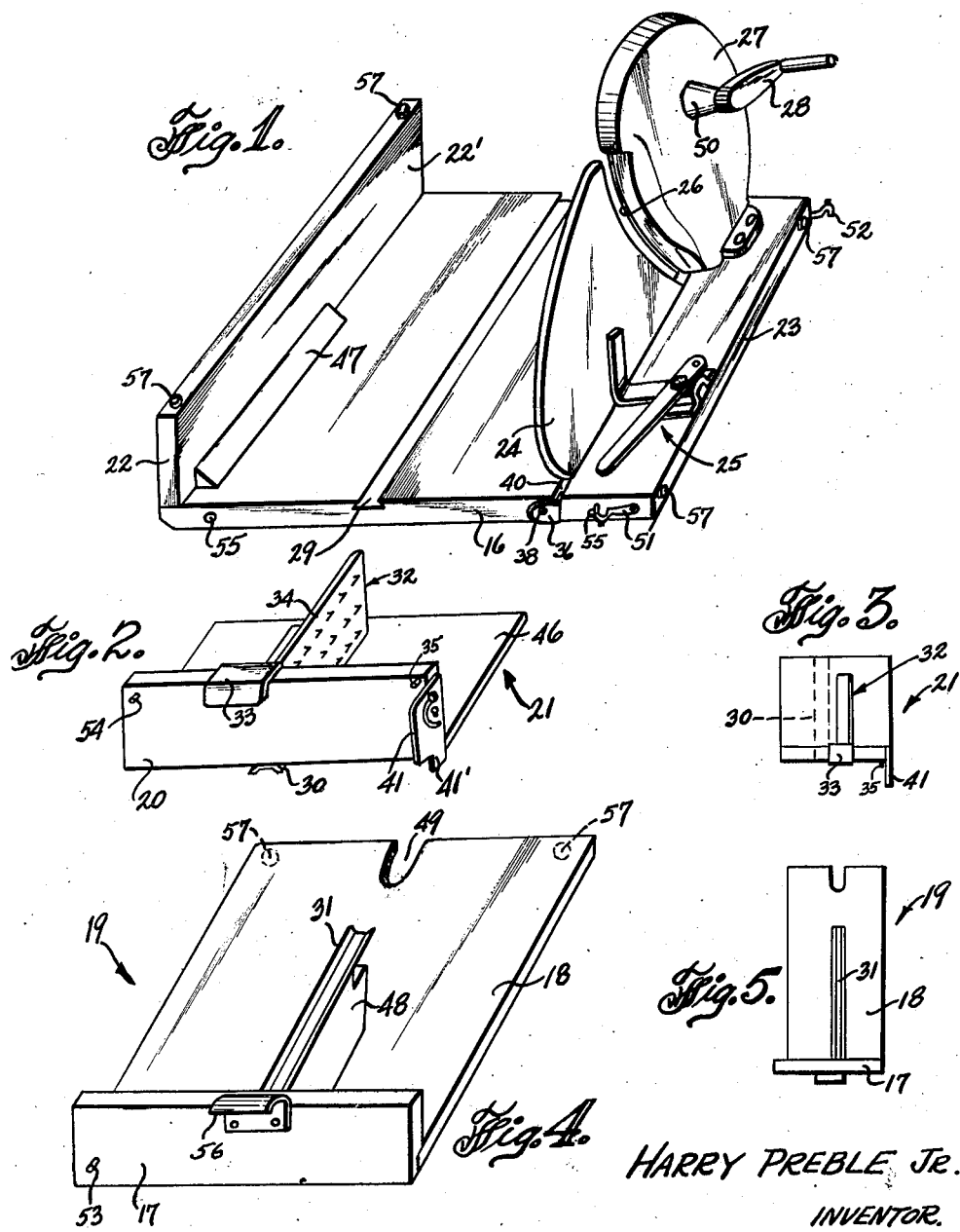
HARRY PREBLE, JR.
INVENTOR.
By
ATTORNEY

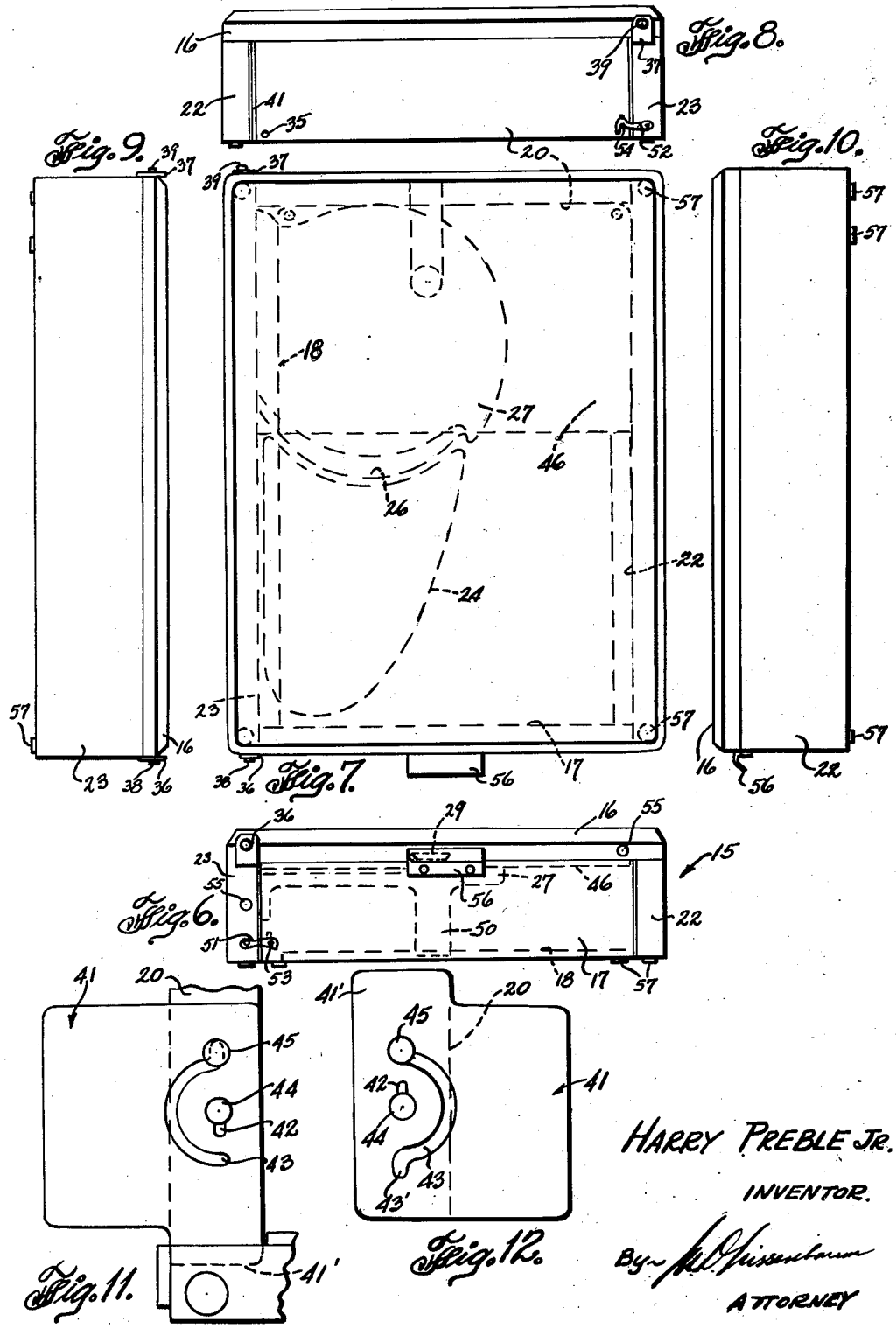

Patented Sept. 23, 1952

2,611,406

UNITED STATES PATENT OFFICE 2,611,406

SLICING MACHINE IN COMBINATION WITH A CABINET THEREFOR

Harry Preble, Jr., Westport, Conn., assignor to General Slicing Machine Company, Inc., Walden, N. Y., a corporation of New York Application February 23, 1950, Serial No. 145,789

6 Claims. (Cl. 146—102)

The present invention relates to a slicing machine of the type employing a food carriage which is slid to and fro past the cutting edge of a knife, and particularly including a folding cabinet which houses such machine when the latter is not in use.

The principal object of this invention is to provide a novel and improved slicing machine and cabinet combination, so constructed that parts of the machine serve as parts of the cabinet, and if desired, the cabinet when housing the slicing machine therein, affords a chopping block and cutting board for general kitchen use.

Another object hereof is to provide a folding slicing machine and cabinet combination of novel, improved and sturdy construction, wherein all machine parts fold, or can be shifted or placed to lie within the cabinet when the machine is not in use.

A further object of this invention is to provide a novel and improved slicing machine and cabinet combination of the character mentioned, which is simple in construction, reasonably cheap to manufacture, easy to set into use and closed conditions, compact in form, and efficient in carrying out the purposes for which it is designed.

Other objects and advantages will become apparent as this disclosure proceeds.

In the accompanying drawings forming part of this specification, similar characters of reference indicate corresponding parts in all the views.

Fig. 1, from which the food carriage is omitted, shows the slicing machine and parts of the cabinet associated therewith, in perspective, arranged in use condition in accordance with the teachings of this invention.

Fig. 2 is a perspective view of the food carriage and its appurtenances.

Fig. 3 is a top view of Fig. 2, in reduced scale, shown in orthographic projection.

Fig. 4 is a perspective view of a part of the cabinet, which is laid aside when the machine is in use.

Fig. 5 is a top view of Fig. 4, reduced in size and shown in orthographic projection.

Fig. 6 is a front view of the closed cabinet housing the slicing machine therein.

Fig. 7 is a top view of Fig. 6.

Fig. 8 shows the rear of the closed cabinet.

Figs. 9 and 10 are side views thereof.

Fig. 11 shows a side view of the finger guard as it appears in use position illustrated in Fig. 2.

Fig. 12 is a similar view of said finger guard shifted to the position it is made to assume when the cabinet is to be closed.

In the drawings, the numeral 15 designates generally the cabinet in closed condition with the slicing machine housed therein, as shown in the Figs. 6–10. The cabinet is comparatively a low one, and its top member 16 may be used as a cutting board and chopping block for general kitchen purposes. The front end of the cabinet is member 17 secured as a wall along an end of the panel 18, the bottom member of the closed cabinet. These components 17 and 18, comprise the unitary structure denoted generally by the numeral 19, a unit having no utility when the slicing machine is in use. The rear end of the closed cabinet is afforded by the upright member 20 which is part of the food carriage 21 of the slicing machine. Fig. 2 shows such carriage and its appurtenances. The side 22 of the cabinet, is a wall along the top member 16 to which it is secured. The other side of the cabinet, is the base board 23 which holds the slicing machine's regulator plate 24 and said plate's positioning means 25, as also the disc knife 26 in the housing 27 of a gear system (not shown) for motivating the knife 26 by means of the removable handle 28.

It may here be noted that when the slicing machine is to be used, the cabinet is inverted, so that member 16 becomes and serves as a base having a track, along which the food carriage 21 is slid to and fro past the knife 26. To attain simplicity of construction, and to accomplish functions as will be hereinafter explained, such track may be a dove-tail groove 29 to receive and engage the channel 30 which is on the underside of the food carriage 21, and also a similar channel 31 carried raised on the panel member 18.

The member denoted generally by the numeral 32, is used to manually push the food being sliced, to contact the regulator plate 24, at the commencement of each slicing. This is well known in the art, hence it will suffice to note that the channel extension 33 of the pronged-plate component 34, sits slidably straddling the top edge of the member 20 of the food carriage. On member 20 is a stop pin 35 to limit the movement of member 32 so that the prong-plate thereof, remains out of contact with the knife 26, when the end region of the food mass on the carriage 21, is reached. It is evident that the member 32 is removable from the food carriage; being a separate member.

The cabinet's side member 23 is preferably removably and of course hingedly mounted on the member 16. Spring steel angle pieces 36 and 37, are secured at the respective ends of the edge of member 23, meaning the edge which is adjacent the member 16, so as to straddle said member 16 between them and respectively receive the pins or pintles 38 and 39 through proper holes in said hinge members 36 and 37. Said pins 38 and 39 extend fixed from the opposite ends of the member 16, and have no heads, to permit removal and attachment of the hinge parts 36 and 37 therefrom, since such hinge parts are springy and may be flexed. In the longitudinal space 40, is free to ride the extension denoted by the numeral 41' of the finger guard 41 which is of sheet metal.

The finger guard 41 extends forwardly of the member 20 when the slicing machine is in use, but is adapted to be shifted on the end of member 20 where it is mounted, to lie wholly rearwardly of the front surface of the member 20, so that said guard lies interior of the closed cabinet, when the cabinet is so arranged. The finger guard is provided with a slot 42 in central position along the diameter determined by a semi-circular slot 43 in said piece. The slot 42 commences at the center of the circle of slot 43 and extends towards the element 41'. The slot 42, at its end which is remote from part 41', continues a little along the said diameter extended. The numerals 44 and 45 designate headed screws through said slots respectively, and secured in the member 20. The finger guard 41 is so positioned and dimensioned that no part thereof protrudes beyond any of the surfaces of part 20, when said finger guard is swung from its position shown in Figs. 2 and 11 to that shown in Fig. 12. In use position of the finger guard, the shank of screw 45 is within the slot extension 43', whereupon said guard is held from swinging movement about the axis 44. When the machine is to be housed within the cabinet, the finger guard 41 is lifted so that screw 45 enters slot 43 proper. Now said guard is swung to assume the position shown in Fig. 12.

When the slicing machine is to be in use, the food carriage 21 is mounted to slide on member 16, with part 20 in front. The position of channel 30 on the underside of platform 46 is such, that when the food carriage is so mounted, the screws 45 and 44 just clear the disc knife 26, and the platform 46 will be spaced from the surface 22' of side wall 22, substantially the thickness of wall 23, which is sufficient for the platform to clear the block 47. Member 20 will also clear such block.

When the cabinet is to be in closed condition, the food carriage 21 is removed from the member 16, and set thereon from the rear so that the platform 46 will contact the block 47 which is a stop therefor, after the finger guard 41 is swung to the position it is shown in Fig. 12. The member 20 now becomes the rear end wall of the cabinet, and is between the side wall members 22 and 23; the latter being swung upward in Fig. 1, so that plate 24 and housing 27 lie horizontal. The handle 28 is removed and is placed within the cabinet with the member 32, as well as with any clamps or other machine fittings which may be included as equipment. The unitary structure 19 is now mounted so that channel 31 engages the track 29, whereby panel 18 becomes the bottom of the cabinet and member 17 the front wall of the now closed cabinet. Block 47 also acts as a stop for the member 17.

Proper positioning of the food carriage 21 in its use and non-use positions requires that the channel 30 be off center away from finger guard edge. The dimensions of the other components of the complete assembly are made to suit. Proper positioning of the unit 19 requires that support 48 be of suitable height. To attain a low cabinet, the panel 18 is provided with a cut-out or notch 49 to admit the boss 50. Also, the width of this panel is less than the horizontal length of member 17, to give a clearance for the regulator plate adjusting mechanism 25 when the cabinet is in closed condition. This is also to have a low cabinet.

To maintain the assembly in closed condition, any suitable means, as for instance the latches or hooks 51 and 52 and their related pins 53 and 54, may be provided. For the engagement of suitable clamps to securely mount the machine on a table when in use, the sockets 55 may be provided. Also, if desired, a handle 56 is mounted on member 17, and a plurality of small pads 57 may serve as feet for the closed cabinet.

To aid definition, the associated cabinet walls 16, 22 and 23 shall be called the "first unit"; the associated cabinet walls 17 and 18 shall be called the "second unit," and the associated components 20 and 46 shall be called the "third unit." The first unit aforesaid is included in Fig. 1, the second is shown in Fig. 4, and the third unit is in Fig. 2.

This invention is capable of numerous forms and various applications without departing from the essential features herein disclosed. It is therefore intended and desired that the embodiment herein shall be deemed illustrative and not restrictive, and that the patent shall cover all patentable novelty herein set forth; reference being had to the following claims rather than to the specific description herein to indicate the scope of this invention.

I claim:

1. In an article of the character described, a cabinet having horizontal top and bottom walls and side and end walls; the side walls being carried by one of the horizontal walls and forming a separate first unit therewith; at least one of the side walls being hinged to its associated horizontal wall for swinging movement to coplanar relationship therewith; one of the end walls and the other horizontal wall being secured to each other to form a separate second unit, a panel secured to the other end wall to form a separate third unit therewith; said panel being positioned within the cabinet adjacent the inside surface of the horizontal wall which carries the side walls; the last mentioned horizontal wall being provided with a single track means extending from front to rear of the cabinet, a track-engagement means carried on the second unit over the horizontal wall member included in the second unit, another track-engagement means carried on the third unit; both said track-engagement means being in sliding engagement respectively with the track means and detachable therefrom; the track-engagement means carried on the second unit, being in engagement with said track means; the third unit serving as the food carriage of a slicing machine; the inside surface of the hinged side wall having mounted thereon, substantially the remainder of a food slicing machine to be housed within the cabinet, whereupon opening the cabinet by removing the second unit from the cabinet structure, setting the horizontal wall having the food carriage thereon onto a flat surface and swinging the hinged side wall to lie coplanar with its associated horizontal wall, all the slicing machine components will be in proper operative relation and workable when the third unit is positioned to slide along the track means whereby the panel and then its associated end wall pass the cutting edge of the knife of the slicing machine, upon movement of the third unit on the first unit.

2. The article as defined in claim 1, including cooperative releasable means on the units to hold all the units together when the cabinet is in assembled closed condition housing the slicing machine.

3. The article as defined in claim 1, including means detachably connecting hinged side wall carrying the mentioned substantially remaining parts of the slicing machine, with the horizontal wall associated normally with said side wall.

4. The article as defined in claim 1, wherein one of the horizontal walls of the cabinet is useable as a chopping block for general kitchen purposes, when the cabinet is in closed condition.

5. The article as defined in claim 1, including a substantially flat finger guard carried swingable in its plane on the end wall which is part of the third unit; said finger guard extending normal to the outside surface of said end wall in direction opposite to that of the panel when the slicing machine is in use; said finger guard and end wall being provided with cooperative means to hold the finger guard in use position and permit positioning of the finger guard to lie normal behind said surface and into the cabinet when the cabinet is to be in closed condition.

6. The article as defined in claim 1, wherein the end wall included in the third unit serves as the rear wall of the cabinet when the cabinet is in closed condition and wherein said third unit is positionable whereby its end wall member is at the front of the cabinet when the slicing machine is in use condition, after the second unit is removed from the first unit, and including stop means carried on the horizontal wall having the track means, for limiting the movement of the second and third units along said track means to properly position the second and third units to accomplish closed condition of the cabinet; said stop means being so positioned that the third unit in operative position along the track as the food carriage of the slicing machine in use, is free of said stop means.

HARRY PREBLE, Jr.

REFERENCES CITED

The following references are of record in the file of this patent:

UNITED STATES PATENTS

| Number | Name | Date |
| --- | --- | --- |
| 110,711 | Wolfinger | Jan. 3, 1871 |
| 2,091,632 | Friedman | Aug. 31, 1937 |
| 2,182,708 | Shlevin | Dec. 5, 1939 |
| 2,222,671 | White | Nov. 26, 1940 |
| 2,250,455 | Babcock | July 29, 1941 |
| 2,288,689 | Duplin | July 7, 1942 |